(12) United States Patent
Abou Rjeily et al.

(10) Patent No.: US 7,769,072 B2
(45) Date of Patent: Aug. 3, 2010

(54) MULTI-ANTENNA COMMUNICATION SYSTEM

(75) Inventors: Chadi Abou Rjeily, Saint Martin d'Heres (FR); Norbert Daniele, Montbonnot (FR); Sebastien De Rivaz, Villard d'Hery (FR)

(73) Assignee: Commissariat a l'Energie Atomique, Paris (FR)

( * ) Notice: Subject to any disclaimer, the term of this patent is extended or adjusted under 35 U.S.C. 154(b) by 1086 days.

(21) Appl. No.: 11/329,102

(22) Filed: Jan. 11, 2006

(65) Prior Publication Data

US 2006/0182166 A1 Aug. 17, 2006

(30) Foreign Application Priority Data

Jan. 12, 2005 (FR) .................................. 05 00289

(51) Int. Cl.
*H04B 1/00* (2006.01)
(52) U.S. Cl. ...................... 375/130; 370/335; 342/379; 375/316; 455/13.3; 455/562.1
(58) Field of Classification Search ................. 375/130; 343/744; 370/335
See application file for complete search history.

(56) References Cited

U.S. PATENT DOCUMENTS 5,389,939 A * 2/1995 Tang et al. .................. 343/754
7,403,508 B1 * 7/2008 Miao .......................... 370/335
2003/0058963 A1 3/2003 Cattaneo et al.
2003/0125090 A1 * 7/2003 Zeira .......................... 455/562

FOREIGN PATENT DOCUMENTS

EP 1 298 811 A1 4/2003
EP 1 482 648 A1 12/2004

OTHER PUBLICATIONS

C. Abou Rjeily, et al., "Performance Analysis of Space-Time Coding Over Ultra-Wideband Channels", 2004 International Conference on Signal Processing & Communications (SPCOM), XP-002344942, 2004, pp. 315-319.
Enzo Baccarelli, et al., "A Simple Multi-Antenna Transceiver for Ultra Wide Band based 4GWLANs", WCNC 2004/IEEE Communications Society, vol. 3, XP-010708212, Mar. 21, 2004, pp. 1782-1787.

(Continued)

*Primary Examiner*—David C Payne
*Assistant Examiner*—Adolf Dsouza
(74) *Attorney, Agent, or Firm*—Oblon, Spivak, McClelland, Maier & Neustadt, L.L.P.

(57) ABSTRACT

The invention relates to a learning process for an ultra wideband communication system with M transmission antennas and N reception antennas and in which the information is modulated on L possible positions comprising the following steps:

a) transmit a series of $N_{seq}$ learning pulses from each emission antenna to all reception antennas.
b) for each reception antenna j, estimate the M composite responses of series of emitted pulses that arrive at this reception antenna j, each composite response being estimated by eliminating the effects of other antennas.
c) estimate correlations between the different channels.

21 Claims, 9 Drawing Sheets

OTHER PUBLICATIONS

Fabien Heliot, et al., "Performance of Space-Time Block coding and Space-Time Trellis coding for Impulse Radio", IEEE Communications Society Globecom 2004, vol. 5, XP-010758316, Nov. 29, 2004, pp. 3225-3229.

Moe Z. Win, et al., "On the Energy Capture of Ultrawide Bandwidth Signals in Dense Multipath Environments", IEEE Communications Letters, vol. 2, No. 9, Sep. 1998, pp. 245-247.

I. Emre Telatar, "Capacity of Multi-antenna Gaussian Channels", Europ. Trans. Telecommun., vol. 10, 1999, pp. 1-28.

Siavash M. Alamouti, "A Simple Transmit Diversity Technique for Wireless Communications", IEEE Journal on Select Areas in Communications, vol. 16, No. 8, Oct. 1998, pp. 1451-1458.

Vahid Tarokh, et al., "Space-Time Block Codes from Orthogonal Desings", IEEE Transactions on Information Theory, vol. 45, No. 5, Jul. 1999, pp. 1456-1467.

Mohamed Oussama Damen, et al., "Diagonal Algebraic Space-Time Block Codes", IEEE Transactions on Information Theory, vol. 48, No. 3, Mar. 2002, pp. 628-636.

G. J. Foschini et al., "Layered Space-Time Architecture for Wireless Communication in a Fadig Environment When Using Multi-Element Antennas", Bell Labs Technical Journal, 1996, pp. 41-59.

Gregory G. Raleigh, et al., "Spatio-Temporal Coding for Wireless Communication", IEEE Transactions on Communications, vol. 46, No. 3, Mar. 1998, pp. 357-366.

Liuqing Yang, et al., "Space-Time Coding for Impulse Radio", 2002 IEEE Conference on Ultra Wideband Systems and Technologies, 2002, pp. 235-239.

Liuqing Yang, et al., "Analog Space-Time Coding for Multiantenna Ultra-Wideband Transmissions", IEEE Transactions on Communications, vol. 52, No. 3, Mar. 2004, pp. 507-517.

Martin Weisenhorn, et al., "Performance of Binary Antipodal Signaling over the Indoor UWB MIMO Channel", IEEE Conference on Communications, vol. 4, 2003, pp. 2872-2878.

Jürgen Kunisch, et al., "An Ultra-Wideband Space-Variant Multipath Indoor Radio Channel Model", IEEE Conference on ultra wideband systems and Technologies, 2003, pp. 290-294.

Ling Li, et al., "Transmit Diversity and Equalization for Frequency Selective Fading Channels", IEEE Vehicular Technology Conference, vol. 3, 2001, pp. 1673-1677.

U.S. Appl. No. 12/444,016, filed Apr. 2, 2009, Abou Rjeily.

U.S. Appl. No. 12/443,919, filed Apr. 1, 2009, Abou Rjeily.

* cited by examiner

MULTI-ANTENNA COMMUNICATION SYSTEM

TECHNICAL DOMAIN AND PRIOR ART

The invention relates to a wireless radio communication system based on the Multiple Input Multiple Output Ultra wideband (UWB MIMO) technology. This technology is based on the emission of signals for which the ratio between the bandwidth and the central frequency is more than 20% [1] or for which the band is more than 500 MHz. The invention discloses a communication system with M transmission antennas and N reception antennas.

Applications of the invention are of the very high speed wireless local networks and personal network type (several hundred Mbits/s); typically communicating terminals equipped with several antennas capable of satisfying multimedia service needs are typical of this type of applications.

The MIMO technique is now very mature in several domains. For narrow band systems, several solutions have been proposed. Alamouti [7] has constructed the first space-time code with 2 transmission antennas; this code transmits at a throughput of 1 symbol for each use of the channel (same throughput for Single Input Single Output <<SISO>> antennas). Tarokh et al. [8] have generalised this code for a system with $M \geq 2$ transmission antennas; codes with throughput of ½ and ¾ have been proposed. Damen has proposed a new family of codes in [9] based on the Hadamard transformation and on rotated constellations. Foschini has proposed a system with no coding in [10], in which M antennas transmit independent symbols, detection being achieved by N reception antennas such that $N \geq M$.

These codes have been adapted to wideband systems. The most frequently adopted approach consists of using the OFDM (Orthogonal Frequency Division Multiplexing) technique. The wideband channel is then converted into several parallel and independent narrow band channels; the space-time codes are then applied to each of these channels [11]. Another approach consists of applying these codes onto symbol blocks to eliminate inter symbol interference introduced by the wideband channel [12].

The ultra wideband (UWB) communication technique is a key technique for high speed radio links in "indoor" type environments. This technique consists of transmitting short time pulses lasting of the order of one nanosecond. In most cases, the information is coded through the position of these pulses (PPM—Pulse Position Modulation). Time hopping (TH) make multiple access possible [2].

For high speed applications, most receivers may be classified in one of the following categories:

RAKE type receivers; in which the received signal is correlated on N parallel channels (corresponding to an order N RAKE) with N delayed and suitably weighted versions in pulse form; (recognition of these delays and amplitudes is acquired during a learning phase) [3].

Correlator type receivers; in which the receiver correlates the received signal with a reference signal to detect emitted symbols; the reference signal is constructed during the channel estimating phase [4], [5].

Several characteristics inherent to UWB systems very quickly limit the performance and the throughput of such systems. These characteristics include the channel effect (attenuation, number of multiple paths, channel spreading, etc.), the signal to noise ratio (SNR), interference of other systems, etc.

One way of overcoming these limitations is to apply MIMO multi antenna processing techniques to UWB systems; these techniques are capable of increasing the capacity and improving the performances of communication systems [6].

The processing adopted in [4] cannot be generalised for MIMO systems. In this situation, each transmission antenna will react as an interference source with regard to other antennas; the method consisting of detecting symbols emitted by each antenna independently or in parallel will severely deteriorate system performances. Symbols emitted by all transmission antennas must be detected jointly and detection of symbols emitted by an antenna must take account of the influence of symbols emitted by other antennas. Putting several systems in parallel [4] is not sufficient and an approach well adapted to the problem must be adopted.

FIG. 1 diagrammatically shows a narrow band MIMO system receiver. Such a receiver comprises a discretiser 2 of a received signal 4, a filter 6, a channel estimator 8 and a decider 10 capable of extracting reconstituted symbols 12.

For narrow band systems, a physical channel may be modelled by a complex random variable that represents the attenuation and phase shift introduced by the channel. For a system with M transmission antennas and N reception antennas, the MIMO channel may be modelled by an "H" matrix with dimension (M, N).

The channel estimate consists of estimating MN values. Once estimated, the "H" matrix will be used for detection of emitted symbols; there are several possible decision techniques; for example, they include "maximum likelihood", V-BLAST, forcing to zero techniques, etc.

OFDM MIMO systems are a generalisation of the previous method in which the scheme in FIG. 1 is applied to each sub-band independently.

FIG. 2 is an example of UWB MIMO system with 2 transmission antennas and one reception antenna 18. The receiver must be capable of detecting the 2 symbols emitted by the transmission antennas from the received signal.

For UWB systems, the received signal is the superposition of several attenuated and delayed versions of the emitted signal. Due to spreading and the density of multiple paths, the channel outputs and inputs are no longer related by a simple product type relation and the concept of a channel matrix "H" that makes detection possible in narrow band systems, is no longer applicable. These are the poor conditions under which the receiver must be capable of separating and detecting signals emitted by all transmission antennas at the same time.

The MIMO technique has recently been applied in the context of UWB communications [13], [14], [15]. The special features of these systems (Short time pulses occupying a pass band of the order of a few GHz) make the processing specific, and wideband space-time coding techniques (a few tens of MHz) cannot be generalised for UWB cases.

The first approach in this domain was made in [13]. The Alamouti code [7] was applied to Impulse Radio systems for a PPM modulation. The proposed system is all analogue and a linear processing is sufficient to assure optimum detection. But in this technique, unlike what happens with this invention which requires a multi-path channel context, the channel was considered as being composed of a single path and the receiver was constructed based on this assumption.

The same analogue system (with 2 transmission antennas) was improved by the same authors in [14]. The channel was then composed of several multiple paths and the receiver uses a "RAKE" type technique to collect the paths.

But this system is incapable of increasing the emitter throughput; it is a characteristic of the Alamouti code that always transmits 1 symbol per use of the channel (2 transmission antennas and one code on 2 time frames). And furthermore, loss of throughput is expected if this method is generalised for M>2 transmission antennas [8]. The performance gain (gain in diversity in the MIMO literature) achieved by this system depends on the number of prongs in the RAKE, and is maximum for an order 1 RAKE and reduces when the number of prongs in the receiver increases. But in practice, the number of prongs in the RAKE must be sufficiently high to capture more energy [3]. In this context, the proposed code is not so interesting and it does not provide any advantage over SIMO systems (one transmission antenna and N reception antennas). The same reasoning is applicable for a "correlation" type receiver.

Finally, in [15], the characteristics of UWB MIMO channels were studied and in particular the variation of inter and auto correlation channel functions as a function of the pass band and the distance between antennas; these studies are based on a generalisation of the channel model described in [16].

FIG. 3 shows a block diagram of the receiver proposed in [15]. The lines 30, 32, 34 represent learning symbols known to the receiver, and lines 26, 27, 29, 31 represent information symbols. Such a device also comprises a channel matrix estimator 201, a time convolution decoder 202, a sampler 22 and a detector 240 of detecting maximum likelihood.

Furthermore, the performance of the antipodal modulation {−1, +1} was studied. The proposed system consists of M transmission antennas and N reception antennas, emitted symbols are not coded (stream independent of the data) and detection is made with a maximum likelihood (ML) type detector. But this proposed system is only adapted to antipodal modulation (the receiver is a sign detector) and it cannot be generalised for PPM modulations and for the multi-user case. Furthermore, the authors have made the assumption that the receiver has perfect knowledge of the channel matrix and therefore no estimating system was proposed.

Furthermore, the ML receiver makes an exhaustive search on all possible combinations of emitted symbols, and therefore its complexity increases exponentially with the number of transmission antennas. This complexity imposes a limit on the number of transmission antennas and consequently a limit on the binary throughout of the system.

In conclusion, the system proposed in [15] and illustrated in FIG. 3 has the following limitations:

1—The channel estimate is made analogically; due to the complexity of this approach, no estimating system has been proposed.

2—The adapted filter is supposed to be carried out analogically. This approach remains optimal theoretically but in practice at the moment no UWB system is capable of performing this task in analogue due to spreading of the UWB channel.

3—Signal sampling after adapted filtering makes this system incapable of detecting symbols modulated in position.

PRESENTATION OF THE INVENTION

The invention proposes a new UWB MIMO system architecture for impulse radio communications with PPM modulation with or without polarity.

In particular, the invention relates to a non-coded system with M transmission antennas and N reception antennas for any values of M and N.

The invention relates firstly to a learning process for an ultra wideband communication system with M ($M \geq 2$) emission antennas and N($N \geq 1$ or 2) reception antennas and in which the information is modulated on L possible positions comprising:

a) Transmit a series of $N_{seq}$ learning pulses from each emission antenna to all reception antennas.

b) For each reception antenna j, estimate the M composite responses $(h_1^{(i,j)}, h_2^{(i,j)}, \ldots, h_{Nech}^{(i,j)})$ of series of emitted pulses that arrive at this reception antenna j, each response being equal to the convolution of the series of learning pulses emitted with the propagation channel transfer function from the emission antenna i to the reception antenna j, each composite response being estimated by eliminating the effects of other antennas.

c) Estimate correlations between the different channels.

Each series of pulses emitted by an emission antenna can be the result of a term by term product for a known sequence $(S_1, S_2, \ldots S_{Nseq})$ common to all emission antennas and a parity code $(c_k^{(i)})$ ($k=1,2, \ldots N_{seq}$) specific to each emission antenna i, the parity codes being orthogonal to each other in pairs.

Step b) may then comprise the following for each channel defined by an emission antenna i ($i=1, \ldots, M$) and arriving at the reception antenna j:

sampling in $N_{ech}$ samples of each of the $N_{seq}$ received pulse frames, where $r_k^{(i)}$ denotes the $k^{th}$ sample of the signal received by the $j^{th}$ antenna, then the calculation of the average $$h_n^{(i,j)} = (\Sigma_{k=1}^{k=Nseq} c_k^{(i)} \times r_{n+(k-1)Nech}^{(j)})/N_{seq}.$$

In one embodiment, step c) includes an estimate of a correlation matrix (R(j)) for each reception antenna, the N matrices then being added to form a total correlation matrix (R).

Step c) may be done from M composite responses.

Step c) can be carried out as follows:

for each reception antenna j, calculate a correlation matrix for each pair of channels (i,j), (i',j), where i and i' denote arbitrary emission antennas, for each reception antenna j, calculate the correlation matrix R(j), calculate a total correlation matrix (R) by summating the individual correlation matrices R(j) for each reception antenna j.

The size of the matrix R(j) is (L×M, L×M), and it is composed of matrices $R^{(\alpha,j)(\beta,j)}$ $$R^{(j)} = \begin{bmatrix} R^{(1,j)(1,j)} & R^{(2,j)(1,j)} & \ldots & \ldots & R^{(M,j)(1,j)} \\ [R^{(2,j)(1,j)}]^T & R^{(2,j)(2,j)} & R^{(3,j)(2,j)} & \ldots & \ldots \\ \ldots & [R^{(3,j)(2,j)}]^T & R^{(3,j)(3,j)} & \ldots & \ldots \\ \ldots & \ldots & \ldots & \ldots & \ldots \\ [R^{(M,j)(1,j)}]^T & \ldots & \ldots & \ldots & R^{(M,j)(M,j)} \end{bmatrix}$$

each matrix $R^{(i,j)(i',j)}$ having terms r(i, i', j)$_{l,c}$ (l=1, ... L, c=1, ... L) defined as follows:

for l=c: r(i, i', j)$_{l,c}$ = $R_0$
for l>c: r(j)$_{l,c}$ = $R_{l-c}$
for l<c: r(j)$_{l,c}$ = $R_{-(l-c)}$
where:

$R_0 = \Sigma_{k=1}^{k=Nech} h_k^{(i,j)} h_k^{(i',j)}$ $R_{l-c} = \Sigma_{k=1}^{k=Nech-(l-c)NPRI} h_{k+(l-c)NPRI}^{(i,j)} h_k^{(i',j)}$ $R_{-(l-c)} = \Sigma_{k=1}^{k=Nech-(l-c)NPRI} h_k^{(i,j)} h_{k+(l-c)NPRI}^{(i',j)}$ where NPRI denotes the number of samples per modulation nominal position.

The invention also relates to a signal detection process to detect signals transmitted by transmission antennas in an ultra wideband communication system comprising M ($M \geq 2$)

transmission antennas and N(N≧2) reception antennas and in which the information is modulated on L possible positions, comprising the following for each reception antenna j:

a) compare the composite responses ($h_1^{(i,j)}$, $h_2^{(i,j)}$, ..., $h_{Nech}^{(i,j)}$) obtained for a known signal for each channel defined by an emission antenna i and a reception antenna j with series of pulses ($r_1^{(j)}$, ... $r_{Nech}^{(j)}$) received by each reception antenna j, each received pulse being equal to the convolution of a pulse emitted with the propagation channel transfer function from the emission antenna i to the reception antenna j, b) construct a decision vector d with length L.M, c) estimate the symbols emitted by transmission antennas from the decision vector and correlations (R) between the different channels.

According to one embodiment, the step b) comprises the calculation of L decision variables $d_1^{(i,j)}, d_2^{(i,j)}, \ldots, d_L^{(i,j)}$ for each channel (i,j), where:

$$d_1^{(i,j)} = \sum_{k=1}^{k=Nech} r_k^{(j)} h_k^{(i,j)}$$

$$d_n^{(i,j)} = \sum_{k=1}^{k=Nech-(n)NPRI} r_{k+(n)NPRI}^{(j)} h_k^{(i,j)}$$

for n=2, ... L, where NPRI denotes the number of samples per nominal modulation position, then the calculation of a decision coefficient $d_l^{(i)} = d_l^{(i,1)} + d_l^{(i,2)} + \ldots d_l^{(i,N)}$, and a decision vector Such a process may include calculation of a vector a:

$$a = R^{-1} \times d,$$

where R is the correlation matrix with dimensions (LM, LM) of the communication system.

It is also possible to determine the nominal modulation position and the polarity of the symbol emitted by each emission or transmission antenna.

The nominal modulation position and the polarity of the symbol emitted by the $m^{th}$ antenna may be determined by the position of the maximum of the modulus of a(m), and by the sign of this maximum respectively, where a(m) is the decision vector corresponding to the symbol emitted by the $m^{th}$ antenna.

The vector may be in the following form:

$$a = \lfloor a^{(1)}, a^{(2)}, \ldots a^{(M)} \rfloor$$

$$= [a_1^{(1)} \ldots a_L^{(1)} a_1^{(2)} \ldots a_L^{(2)} \ldots a_1^{(M)} \ldots a_L^{(M)}]$$

where $a^{(m)} = \lfloor a_1^{(m)} \ldots a_L^{(m)} \rfloor$ is a decision vector corresponding to the symbol emitted by the $m^{th}$ transmission antenna (m=1, 2, ... M).

The invention also relates to a communication process, PPM modulated signals of the ultra wideband type, using M transmission antennas and N reception antennas comprising:

a learning process according to the invention as described above, a transmission phase of a stream of data symbols, then for each transmitted signal and for each reception antenna j, a comparison between the composite responses ($h_1^{(i,j)}$, $h_2^{(i,j)}$, ..., $h_{Nech}^{(i,j)}$) and the series ($r_1^{(j)}$, ... $r_{Nech}^{(j)}$) of pulses received by this reception antenna j, each received pulse being equal to the convolution of a pulse emitted with the propagation channel transfer function from the emission antenna i to the reception antenna j, for each channel (i,j), calculation of L decision variables $d_1^{(i,j)}, d_2^{(i,j)}, \ldots, d_L^{(i,j)}$, in which:

$$d_1^{(i,j)} = \sum_{k=1}^{k=Nech} r_k^{(j)} h_k^{(i,j)}$$

$$d_n^{(i,j)} = \sum_{k=1}^{k=Nech-(n)NPRI} r_{k+(n)NPRI}^{(j)} h_k^{(i,j)}$$

for n=2, ... L, where NPRI denotes the number of samples per nominal modulation position, then calculation of a decision coefficient $d_l^{(i)} = d_l^{(i,1)} + d_l^{(i,2)} + \ldots d_l^{(i,N)}$, and a decision vector $$d = [d_1^{(1)} \ldots d_L^{(1)}, d_1^{(2)} \ldots d_L^{(2)} \ldots d_1^{(M)} \ldots d_L^{(M)}]$$

Where $d_l^i$ corresponds to the $l^{th}$ decision coefficient corresponding to the $i^{th}$ transmission antenna.

The learning phase may include:

transmission of a sequence through M channels to M transmission antennas, term by term multiplication of the sequence of each channel with a sequence of parity codes, the codes being orthogonal to each other in pairs.

The transmission phase of a stream of symbols may include:

demultiplexing of the stream of symbols into M streams corresponding to M transmission antennas, position modulation of symbols and their transmission to M transmission antennas.

Preferably, the separation between antennas enables decorrelation between channels. For example the separation d between two antennas is such that $d/\lambda > 0.5$, where $\lambda$ is the wavelength corresponding to the central frequency.

The invention also relates to a communication system of the ultra wideband type comprising M emission antennas and N reception antennas, and:

for each reception antenna j, an estimator of composite responses ($h_1^{(i,j)}$, $h_2^{(i,j)}$, ... $h_{Nech}^{(i,j)}$) of series of emitted pulses that reach this reception antenna j, each response being equal to the convolution of the series of pulses emitted with the propagation channel transfer function from the emission antenna i to the reception antenna j, each composite response being estimated by eliminating the effects of other antennas, an estimator of correlations (R) between the different channels, an estimator of a symbol emitted by an emission antenna as a function of a received signal ($r_1^{(j)}$, ... $r_{Nech}^{(j)}$), composite responses and correlations.

Estimator of an emitted symbol can then include an additional calculator of L decision variables $d_1^{(i,j)}, d_2^{(i,j)}, \ldots, d_L^{(i,j)}$ for each channel i (i=1, ..., M) reaching the reception antenna j, where:

$$d_1^{(i,j)} = \sum_{k=1}^{k=Nech} r_k^{(j)} h_k^{(i,j)}$$

$$d_n^{(i,j)} = \sum_{k=1}^{k=Nech-(n)NPRI} r_{k+(n)NPRI}^{(j)} h_k^{(i,j)}$$

for n=2, ... L, where NPRI denotes the number of samples per nominal modulation position, then the calculation of a decision coefficient $d_l^{(i)} = d_l^{(i,1)} + d_l^{(i,2)} + \ldots d_l^{(i,N)}$, and a decision vector $$d = [\underline{d_1^{(1)} \ldots d_L^{(1)}}, \underline{d_1^{(2)} \ldots d_L^{(2)}} \ldots \underline{d_1^{(M)} \ldots d_L^{(M)}}]$$

Where $d_l^i$ corresponds to the $l^{th}$ decision coefficient corresponding to the $i^{th}$ transmission antenna.

Such a communication system may also include a calculator of a vector a:

$$a = R^{-1} \times d,$$

where R is the correlation matrix with dimensions (LM, LM) of the communication system.

Such a communication system may also include a finder of the nominal modulation position and the polarity of the symbol emitted by each emission or transmission antenna.

DETAILED PRESENTATION OF PARTICULAR EMBODIMENTS

At the emission end, a UWB communication system according to the invention comprises M (M≧2) emission or transmission antennas that may emit pulse sequences with an average emission period called the PRP (Pulse Repetition Period), for which the position and/or the polarity carry information.

When the information is modulated on L possible positions, the term modulation L_PPM (L_ary Pulse Position Modulation) is used. The time separation between two successive modulation positions is called PRI (Pulse Repetition Interval).

The separation between emission antennas is preferably sufficiently large to assure decorrelation between channels, usually this decorrelation is satisfied for a separation d such that d/λ>0.5, where λ is the wavelength corresponding to the central frequency. Therefore for a central frequency of 6 GHz, d satisfies d>5 cm.

When the L_PPM is associated with a polarity modulation, each emitted symbol can be equal to one among 2L possible values.

A position ($\Delta_l$) and a polarity ($p_l$) are associated with each symbol $S_l$ as follows:

$$p_l = 1; \Delta_l = (l-1)\text{PRI for } l = 1, 2, \ldots L$$

$$p_l = -1; \Delta_l = (l-L-1)\text{PRI for } l = L+1, L+2, \ldots 2L$$

Figure 5:
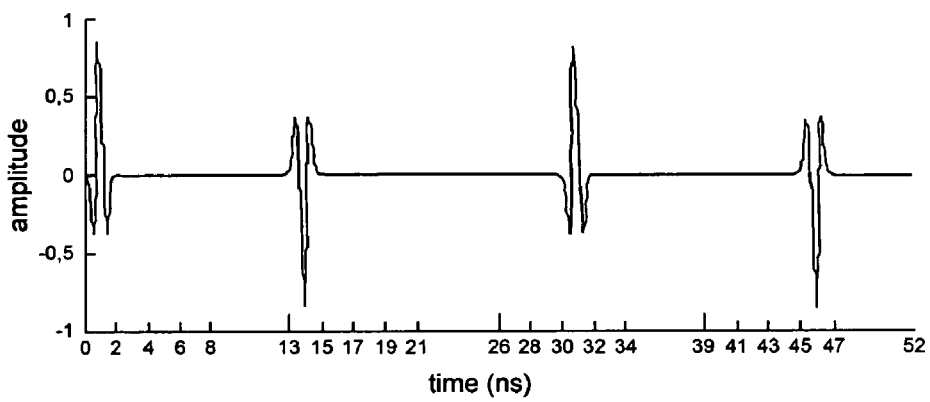
FIG. 5 shows an example of PPM pulse streams.

At the end of each PRI, a GAP can be added to eliminate inter symbol interference taking account of this GAP; the result is then the relation PRP=L.PRI+GAP FIG. 5 is an example of a pulse stream for the 4_PPM case with polarities, PRI=2 ns, GAP=5 ns. The sequence of emitted symbols is (1, 2, 5, 8).

The sum of powers emitted by all transmission antennas respects the mask proposed by regulation bodies. For a system with a transmission antenna, the emitted wave shape is represented in FIGS. 6A and 6B, the amplitude of this wave shape being divided by $\sqrt{M}$ for a system with M transmission antennas.

Figure 6A:
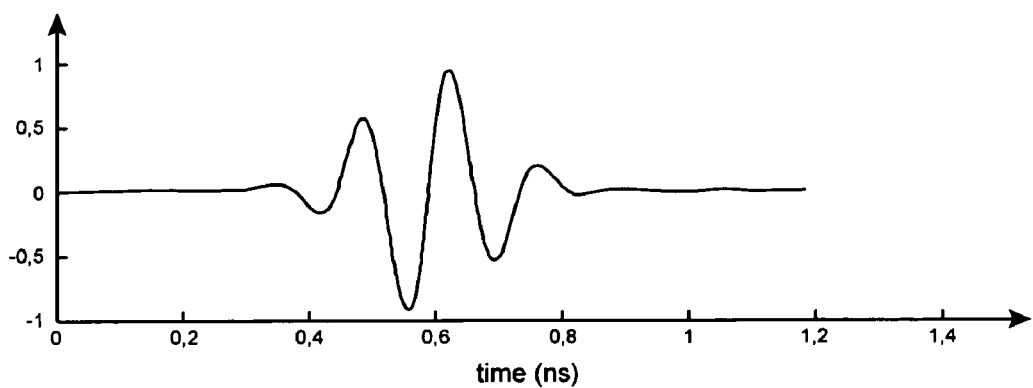
FIGS. 6A and 6B show an ultra wideband pulse.
Figure 6B:
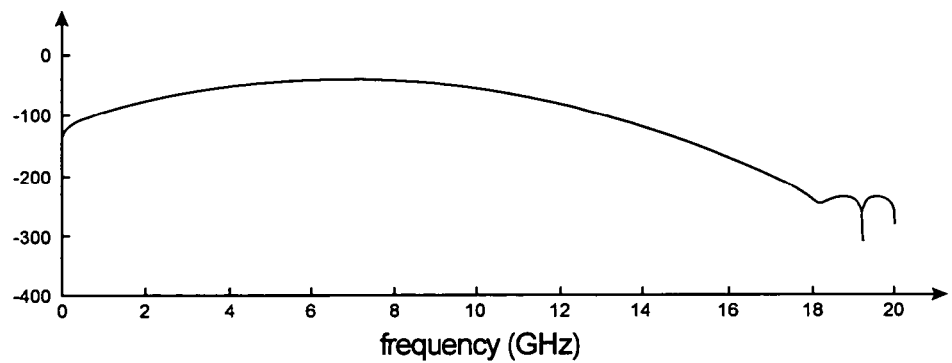

FIGS. 6A and 6B show an example of a UWB pulse with width 600 ps for which the spectrum is centred on 7 GHz. Since the pass band at −3 dB is 1.6 Ghz, the spectrum is compatible with the Indoor UWB emission mask imposed by the FCC.

Two emission phases can be distinguished, emission during the learning mode and emission of information symbols.

During the learning phase, a sequence $S_1, S_2, \ldots S_{Nseq}$ of symbols with size $N_{seq}$ is transmitted for each emission antenna. This sequence is known to the receiver and will be used for estimating the channel. These symbols may be equal to any value: for example, it may be considered that all these symbols are equal to the value "1" (positive polarity during the first nominal time). This sequence is then divided into M sequences corresponding to M transmission antennas.

A term by term multiplication of the sequence of symbols is made with a parity code sequence, on each branch. This code contains $N_{seq}$ elements that may be equal to the values ±1.

Figure 7:
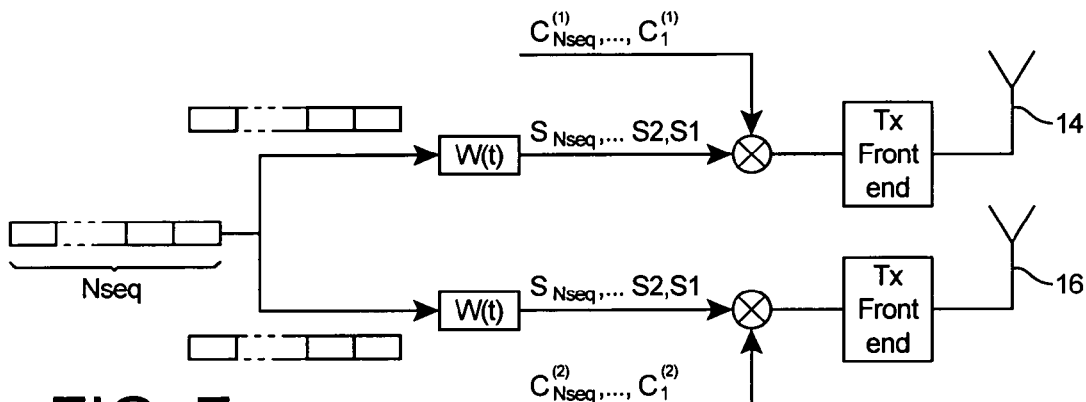
FIG. 7 shows a system with two antennas according to the invention during a learning phase.

FIG. 7 shows a transmission system with 2 emission antennas 14, 16 during the learning phase. w(t) corresponds to a pulse formatting filter. The multiplication of two sequences on each branch is made term by term.

A code with length $N_{seq}$ is constructed for each antenna, orthogonal to the codes of all other antennas. These codes satisfy:

$$c_1^{(i)} c_1^{(j)} + c_2^{(i)} c_2^{(j)} + \ldots + c_{Nseq}^{(i)} c_{Nseq}^{(j)} = 0$$

for i,j=1,2, ... M and i≠j.

where $c_k^{(i)}$ is the $k^{th}$ element of the code of the emission antenna $j^{th}$.

Figure 8:
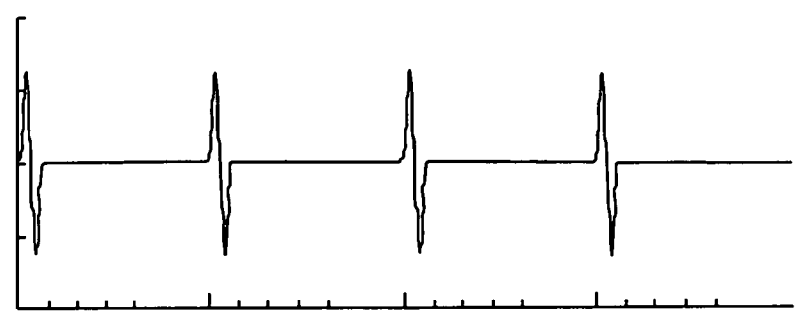
FIG. 8 shows an example of pulse stream emitted during the learning phase according to the invention.
Figure 8:
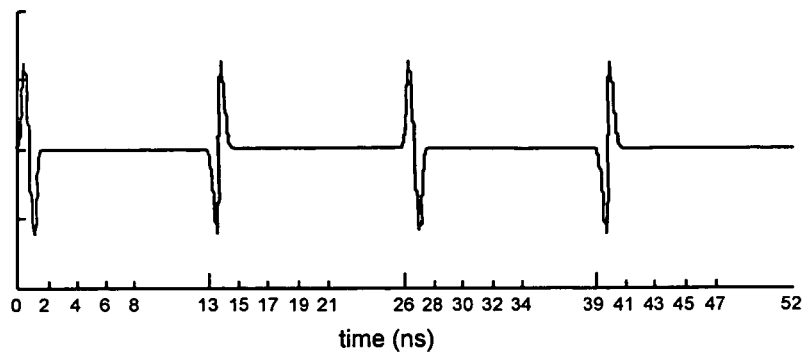

FIG. 8 is an example of pulses emitted by the two antennas 14, 16 of an emitter during the learning phase; the modulation type is 4_PPM with polarity, PRI=2 ns, GAP=5 ns, $N_{seq}$=4; the codes of the 2 antennas are {1,1,1,1} and {1, −1,1, −1} respectively. The pulses shown in FIG. 8 are the result of the term by term multiplication of the pulse sequence S by the two codes.

These codes may be constructed for any values of M and $N_{seq}$, such that $M \leq N_{seq}$, for example from Hadamard matrices. The reasons for this orthogonality will be explained later.

Figure 1:
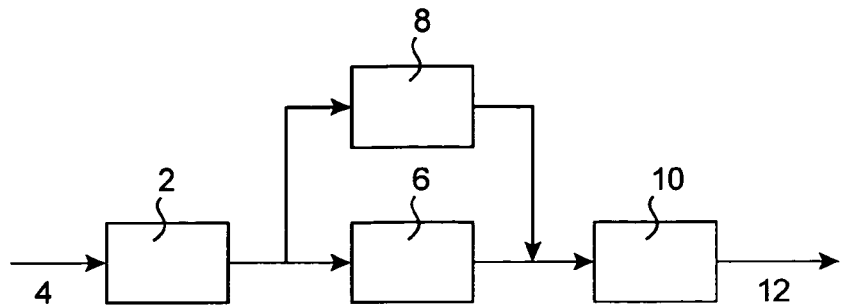
FIG. 1 shows a narrow band MIMO receiver device.
Figure 2:
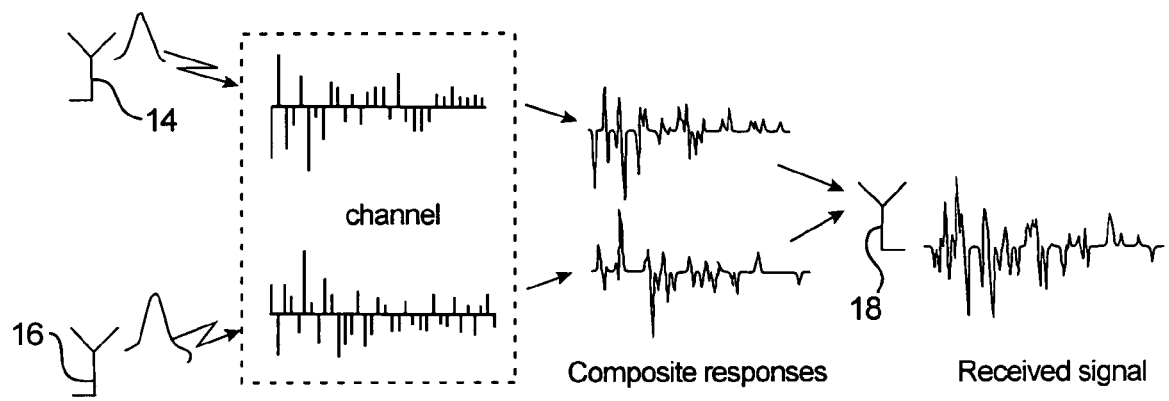
FIG. 2 shows signals emitted between emission antennas and a reception antenna.
Figure 3:
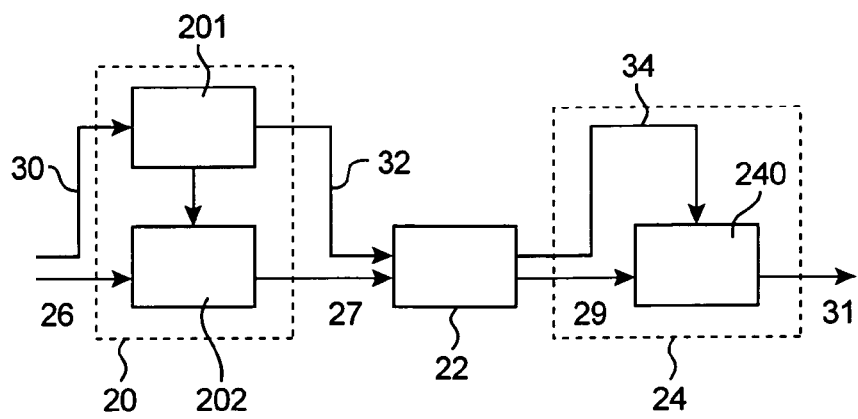
FIG. 3 shows a device according to prior art.
Figure 4:
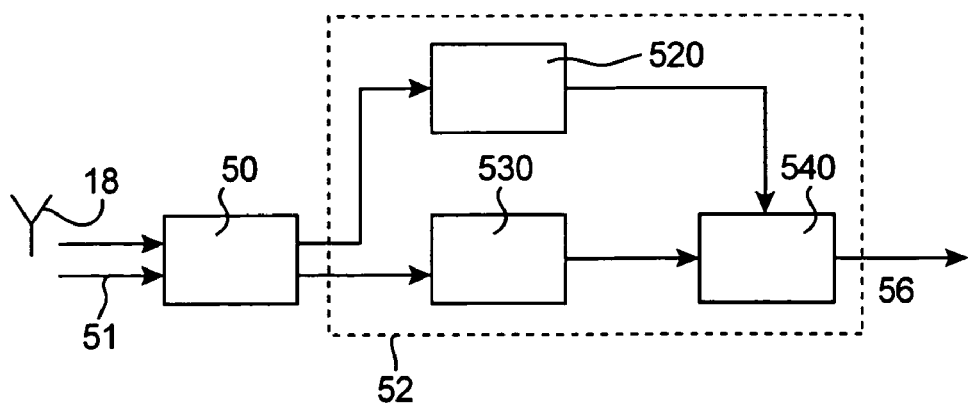
FIG. 4 shows a device according to the invention.

FIG. 4 shows a block diagram of a reception system according to the invention for each reception antenna. Channel discretiser 50 is used to discretise a signal 51 received by a reception antenna 18.

A digital processor 52 comprises an estimator 520, a filter 530 and a decider 540. The reference 56 denotes reconstituted symbols.

The reception system 52 in FIG. 4 comprises two functional blocks; the first block 520 is used for the channel estimate and the second block 530 is used for these estimates to detect symbols 51 carrying information.

These blocks are made digitally. They are preceded by a "front end" radio frequency reception interface Rx (LNA, pass band filter, etc.) and by a discretisation step (discretiser 50 shown in FIG. 4).

The receiver receives composite responses of signals sent, these responses being equal to the convolution of the (known) pulse emitted with the propagation channel (of the multiple path type).

The estimating stage 520 is divided into two parts, the estimate of the composite responses of all channels concerned and calculation of the correlation matrix.

Estimate of Composite Responses:

This step consists of estimating a discrete image of M×N composite responses for a system with M transmission antennas and N reception antennas. We will use $h_n^{(i,j)}$ to refer to the $n^{th}$ sample of the composite response $h(i,j)$ between the $i^{th}$ transmission antenna and the $j^{th}$ reception antenna.

The output from each antenna is firstly sampled at the Nyquist frequency $N_y$, and is then quantified on $2^n$ levels corresponding to the n bits. Assuming that each frame (corresponding to a PRI) is sampled on $N_{ech}$ samples such that:

$$N_{ech} = (\text{frame period})/(\text{sampling period})$$

There will be a sequence of $N_{seq}$ frames at the output from each reception antenna 18, each of these frames containing $N_{ech}$ samples. The $n^{th}$ sample of a frame at the output from the $j^{th}$ antenna is represented by $r_n^{(j)}$.

The output from this reception antenna is divided into M branches so as to have a discrete image of the M channels arriving at the $j^{th}$ antenna; the $i^{th}$ branch is processed by calculating the following average:

$$h_k^{(i,j)} = (\Sigma_l c_l^{(i)} \times r_{k+(l-1)Nech}^{(j)})/N_{seq}$$

where $k=1, \ldots N_{seq}$ and where the sum is taken for 1 variant from 1 to $N_{seq}$. Therefore, a series of coefficients $h_k^{(i,j)}$ is obtained for each emission antenna i and for each reception antenna j.

If all reception antennas are considered, there will be a total of M×N estimators that operate in parallel and independently of each other; the orthogonality of the codes assures that each composite response is estimated by eliminating the effects of the other antennas.

Figure 10:
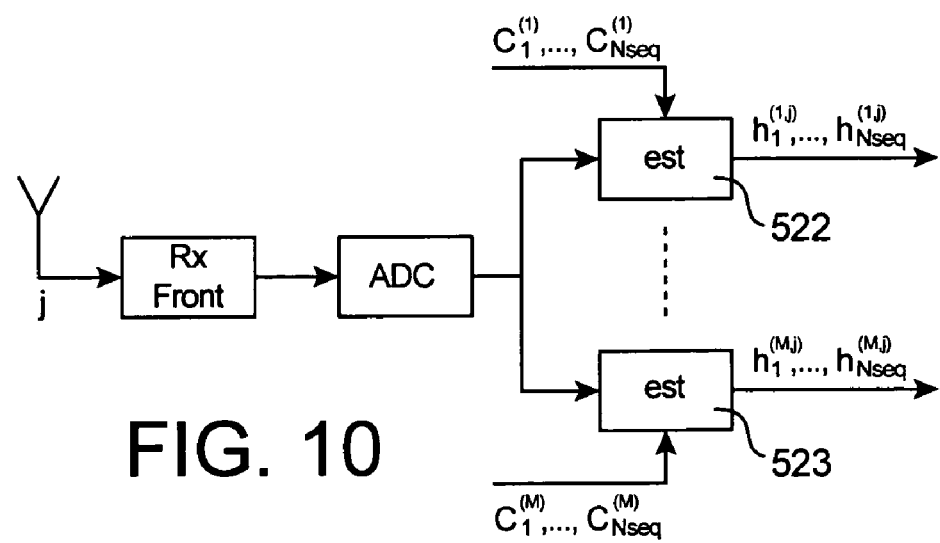

FIG. 10 shows an example of the first estimating step on the $j^{th}$ antenna; each block 522, 523 makes the weighted average described above; therefore the estimator at the output from each reception antenna provides discrete images of M channels $h(i,j)$, $i=1, 2, \ldots M$.

Figure 11A:
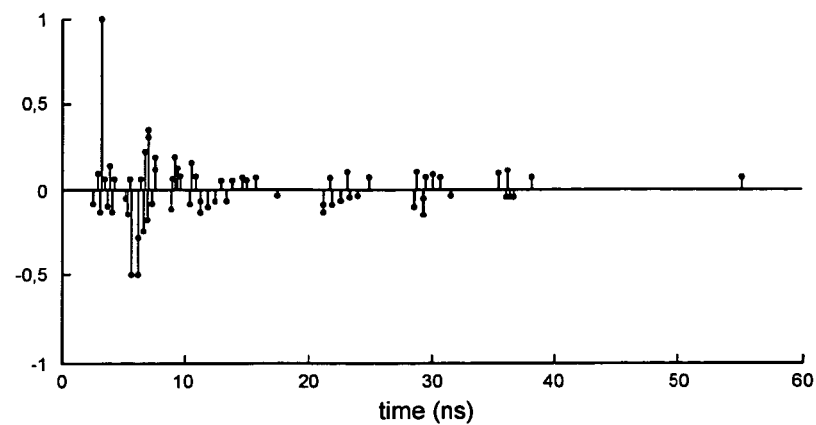
FIGS. 11A-11D show various signals (pulse response from two channels, noisy frames received in learning phase, and composite estimates of two channels), FIG. 12 diagrammatically shows a correlator used in the framework of a device according to the invention, FIG. 13 diagrammatically shows the second estimating stage of a device according to the invention, for 3 transmission antennas and two reception antennas, FIG. 14 diagrammatically shows the phase and channel estimator at the output from each reception antenna in a device according to the invention, FIG. 15 diagrammatically shows processing on a branch at the output from a reception antenna for a PPM modulation in the context of a process according to the invention, FIG. 16 diagrammatically shows a first detection step in the context of a process according to the invention, FIG. 17 diagrammatically shows a receiver according to the invention.

FIGS. 11A-11D show an example of a system with 2 transmission antennas and one reception antenna. FIG. 11A shows the pulse responses of 2 channels $h(1,1)$ (dashed lines) and $h(1,2)$ (continuous lines); these are the results of querying the channel in an "indoor" environment, the transmission antennas being separated by 20 cm and the distance between the emitter and the receiver being 3 m.

Figure 11B:
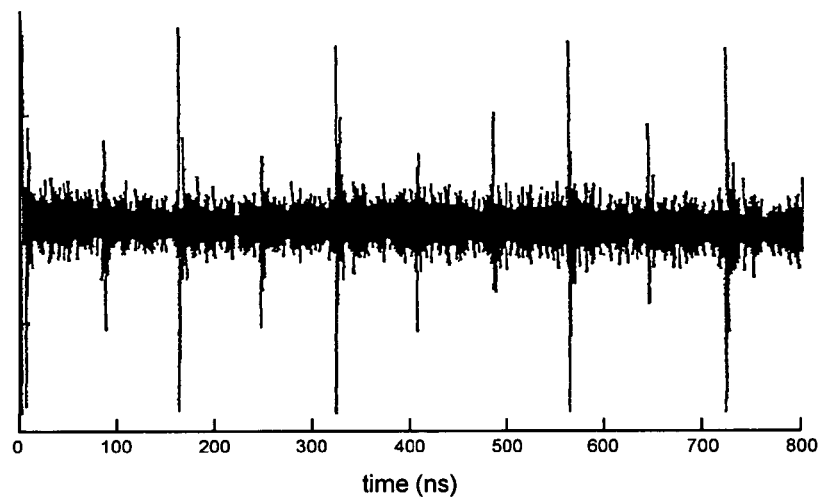

FIG. 11B shows noisy frames received during the learning phase; PRP=80 ns, the length of the learning sequence (Nseq) is 10; $c(1)=\{1,1,1,1,1,1,1,-1,-1,-1\}$ and $c(2)=\{1,-1,1,-1, 1,-1,1,-1,1,-1,\}$.

Figure 11C:
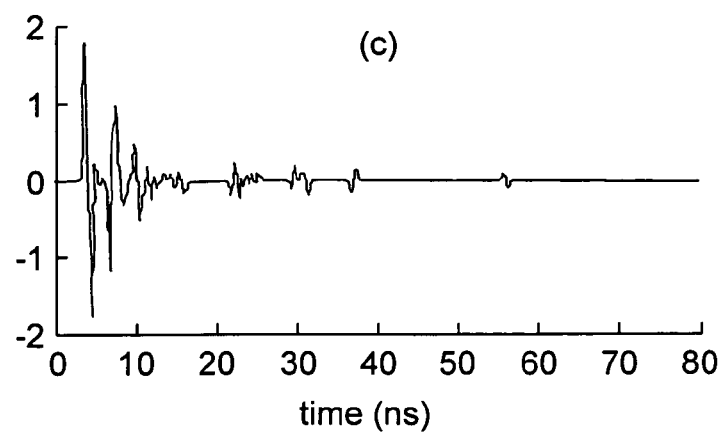
Figure 11D:
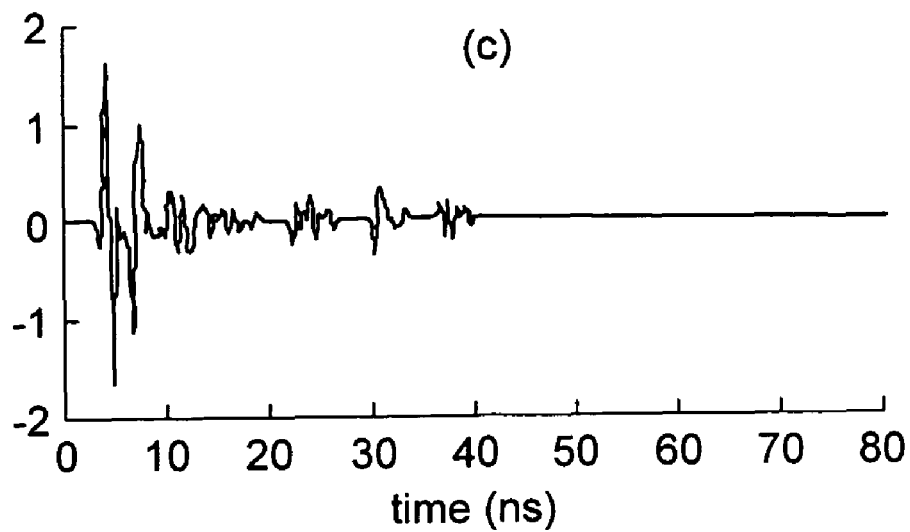

FIGS. 11C and 11D show composite estimates of 2 channels at the output from the first part of the estimator, for a sequence with length 80.

Calculation of the Correlation Matrix:

The system comprises M antennas that transmit independent data sequences; an attempt is made to eliminate interference between these antennas in order to improve system performances. Composite response images are not sufficient; consequently, the first part or the first estimator are followed by a second part or second provider that provides information about correlations between the different channels (i,j).

The output from the second part of the estimator will be a matrix with dimensions (L×M,L×M) for a L_PPM modulation with or without polarity.

Figure 12:
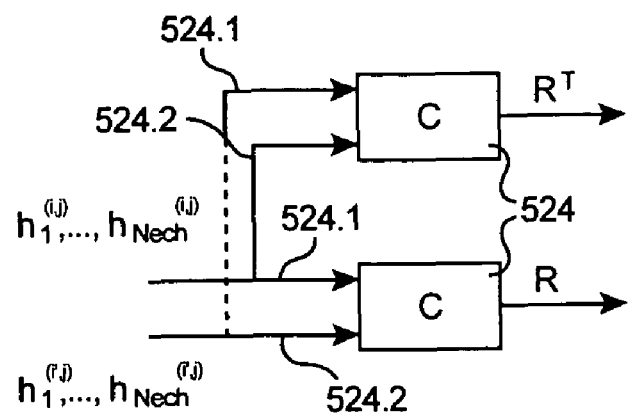

Construction of the second part of the estimator will be based on a correlator block 524 (FIG. 12). This block uses the two digital sequences with sizes $N_{ech}$ as input:

$$h_1^{(i,j)}, h_2^{(i,j)}, \ldots, h_{Nech}^{(i,j)} \quad (1)$$

$$h_1^{(i',j)}, h_2^{(i',j)}, \ldots, h_{Nech}^{(i',j)} \quad (2)$$

and the output consists of a matrix $R(i,j)(i',j)$ with dimensions (L×L).

The number of samples per nominal modulation position is denoted by NPRI:

$$NPRI = PRI/(\text{sampling period}).$$

The notations are simplified by denoting each of the two sequences (1) and (2) above at inputs 521-1 and 524-2 of block 524 respectively, by $(c(1),c(2), \ldots c(N_{ech}))$ and $(d(1), d(2), \ldots d(N_{ech}))$; the correlator block 524 firstly calculate the following 2L-1 quantities:

$$R_0 = c(1).d(1) + c(2).d(2) + c(N_{ech}).d(N_{ech})$$

$$\begin{cases} R_1 = c(N_{PRI}+1).d(1) + c(N_{PRI}+2).d(2) + \\ c(N_{ech}).d(N_{ech} - N_{PRI}) \\ \vdots \end{cases}$$

$$\vdots$$

$$R_{L-1} = c((L-1).N_{PRI}+1).d(1) + c((L-1).N_{PRI}+2).d(2) + \ldots c(N_{ech}).d(N_{ech} - (L-1).N_{PRI})$$

$$\begin{cases} R_{-1} = c(1).d(N_{PRI}+1) + c(2).d(N_{PRI}+2) + \\ \ldots .c(N_{ech} - N_{PRI}).d(N_{ech}) \\ \vdots \end{cases}$$

$$\vdots$$

$$R_{-(L-1)} = c(1).d((L-1).N_{PRI}+1) + c(2).d((L-1).N_{PRI}+2) + \ldots c(N_{ech} - (L-1).N_{PRI}).d(N_{ech})$$

Therefore a cross correlation calculation is done.

The following calculation is an example of the calculation of correlation coefficients for a 2_PPM modulation with polarity, $N_{ech}=7$ and $N_{PRI}=2$; there will be 3 correlation parameters $R_{-1}$, $R_0$ and $R_1$ at the output.

$$x \frac{\begin{array}{ccccccc} c_1 & c_2 & c_3 & c_4 & c_5 & c_6 & c_7 \\ d_1 & d_2 & d_3 & d_4 & d_5 & d_6 & d_7 \end{array}}{c_1 d_1 + c_2 d_2 + c_3 d_3 + c_4 d_4 + c_5 d_5 + c_6 d_6 + c_7 d_7 = R_0}$$

$$x \frac{\begin{array}{ccccccccc} c_1 & c_2 & c_3 & c_4 & c_5 & c_6 & c_7 & 0 & 0 \\ 0 & 0 & d_1 & d_2 & d_3 & d_4 & d_5 & d_6 & d_7 \end{array}}{c_3 d_1 + c_4 d_2 + c_5 d_3 + c_6 d_4 + c_7 d_5 = R_1}$$

$$x \frac{\begin{array}{ccccccccc} 0 & 0 & c_1 & c_2 & c_3 & c_4 & c_5 & c_6 & c_7 \\ d_1 & d_2 & d_3 & d_4 & d_5 & d_6 & d_7 & 0 & 0 \end{array}}{c_1 d_3 + c_2 d_4 + c_3 d_5 + c_4 d_6 + c_5 d_7 = R_{-1}}$$

After the (2L−1) correlation coefficients have been calculated, the block 524 builds up a matrix R(i,j) (i',j) with dimensions (L×L) in the following form:

$$R(i, j)(i', j) = \begin{bmatrix} R_0 & R_{-1} & \ldots & \ldots & \ldots & R_{-(L-1)} \\ R_1 & R_0 & R_{-1} & \ldots & \ldots & \ldots \\ R_2 & R_1 & R_0 & R_{-1} & \ldots & \ldots \\ \ldots & R_2 & R_1 & R_0 & R_{-1} & \ldots \\ \ldots & \ldots & R_2 & R_1 & R_0 & R_{-1} \\ R_{L-1} & \ldots & \ldots & R_2 & R_1 & R_0 \end{bmatrix}$$

If the inputs of block 524 ((d(1), d(2), . . . d($N_{ech}$)) are crossed at input 524-1 and (c(1), c(2), . . . . c($N_{ech}$)) at input 524-2, the matrix $R^T$ is obtained at the output in which $(.)^T$ corresponds to the transpose of a matrix. This property will be used to simplify the structure of the channel estimator.

Therefore the correlator that is diagrammatically represented in FIG. 12, uses 2 digital sequences with length $N_{ech}$ as input and its output is a matrix with dimensions L×L. Inputs 524-1 and 524-2 are not symmetric, and these inputs can be crossed to transpose the output matrix R (i,j) (i',j).

There are M discrete images of M channels that arrive at the output from each reception antenna j; a correlation matrix based on the block 524 is calculated between all these inputs.

If we consider the $j^{th}$ reception antenna, and after the first estimating phase, we will have M sequences $(h_1^{(i,j)}, h_2^{(i,j)}, \ldots, h_{Nech}^{(i,j)})$ for i=1, 2, . . . M. The output from block 524 that corresponds to the sequence $(h_1^{(i,j)}, h_2^{(i,j)}, \ldots, h_{Nech}^{(i,j)})$ on input 524-1 and the sequence $(h_1^{(i',j)}, h_2^{(i',j)}, \ldots, h_{Nech}^{(i',j)})$ on input 524-2 will be called R(i,j) (i',j).

Based on the inversion property of inputs to block 524, we can write the equality:

$$R^{(i,j)(i',j)} = [R^{(i',j)(i,j)}]^T$$

The matrix R(j) with dimensions (L.M,L.M), for the reception antenna j can be written from these matrices R(i,j)(i',j) in the following form:

$$R^{(j)} = \begin{bmatrix} R^{(1,j)(1,J)} & R^{(2,j)(1,j)} & \ldots & \ldots & R^{(M,j)(1,j)} \\ [R^{(2,j)(1,j)}]^T & R^{(2,j)(2,j)} & R^{(3,j)(2,j)} & \ldots & \ldots \\ \ldots & [R^{(3,j)(2,j)}]^T & R^{(3,j)(3,j)} & \ldots & \ldots \\ \ldots & \ldots & \ldots & \ldots & \ldots \\ [R^{(M,j)(1,j)}]^T & \ldots & \ldots & \ldots & R^{(M,j)(M,j)} \end{bmatrix}$$

Returning to the initial notations $(h_1^{(i,j)}, h_2^{(i,j)}, \ldots, h_{Nech}^{(i,j)})$ and $h_1^{(i',j)}, h_2^{(i',j)}, \ldots h_{Nech}^{(i',j)}$, it can be said that each of the matrices $R^{(i,j)(i',j)}$ includes terms r(i, i', j)$_{l,c}$ (l=1 . . . L, c=1, . . . L) defined by:

for l=c:r(i, i', j)$_{l,c}$=$R_0$ for l>c:r(j)$_{l,c}$=$R_{l-c}$ for l<c:r(j)$_{l,c}$=$R_{-(l-c)}$ where:

$$R_0 = \sum_{k=1}^{k=Nech} h_k^{(i,j)} h_k^{(i',j)}$$

$$R_{l-c} = \sum_{k=1}^{k=Nech-(l-c)NPRI} h_{k+(l-c)NPRI}^{(i,j)} h_k^{(i',j)}$$

$$R_{-(l-c)} = \sum_{k=1}^{k=Nech-(l-c)NPRI} h_k^{(i,j)} h_{k+(l-c)NPRI}^{(i',j)}$$

where NPRI denotes the number of samples per nominal modulation position.

The matrices of the N reception antennas are then added to form the matrix R such that:

$$R=R(1)+R(2)+ \ldots +R(N)$$

Figure 13:
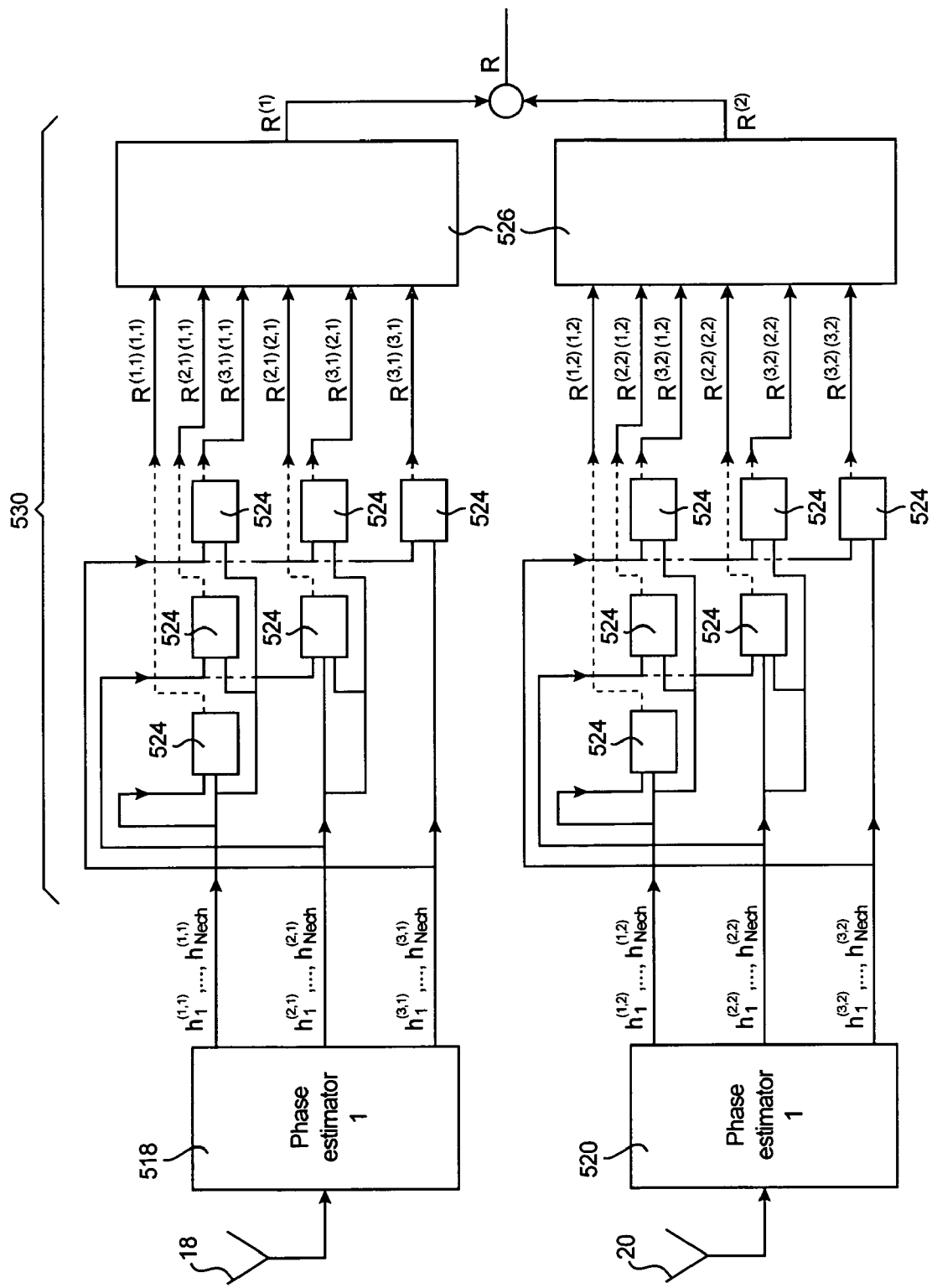

FIG. 13 is a diagrammatic representation of the second estimating stage for a system with 3 transmission antennas, 2 reception antennas 18, 20 and where L is arbitrary; each "Phase 1 estimator" block 518, 520 corresponds to the first stage of the estimating phase, in other words the formation of discrete images of pulse responses already explained above. The M sequences with length $N_{ech}$ at the output of each antenna attack the second part of the estimator, this second part comprising 6 blocks 524, and the output is matrices R(i,j) (i',j) for i≧i' and j=1,2. The block 526 consists of forming correlation matrices R(j) for j=1,2 as explained above (formula (3)), the size of these matrices being 2L, 2L.

The transposition function is made inside block 526.

In summary, each reception antenna is followed by a channel estimating step. This step uses the digital sequence at the output from this antenna as input and its output is M sequences of sample lengths $N_{ech}$. A correlation matrix with size (L×M,L×M) is obtained for each reception antenna, containing "crossed products" of all M sequences.

Figure 14:
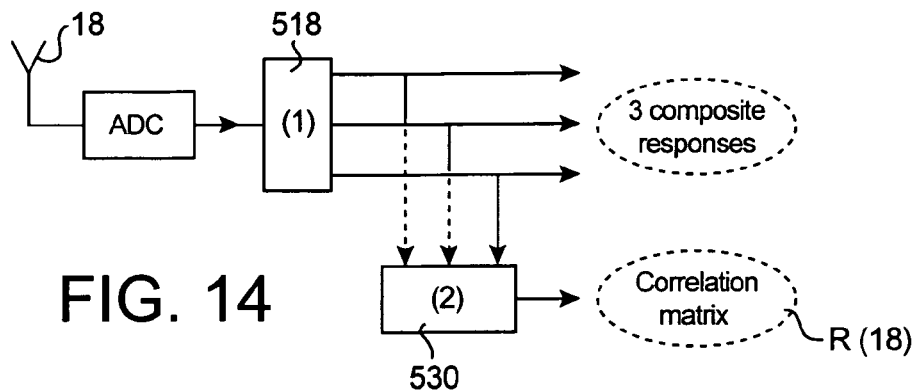

FIG. 14 is a diagrammatic representation of the channel estimating phase at the output from each reception antenna j (for a system with M=3 transmission antennas).

The correlation matrices R(j) of all antennas are then added to form the matrix R.

The estimating operations described above will enable the receiver in each antenna to use these estimates to detect arbitrary symbols carrying information. Detection is made frame by frame; in other words symbols emitted by the M antennas during a frame (corresponding to a PRP) are detected independently of symbols emitted during the other frames.

During a phase in which arbitrary data or information symbols are transmitted, the emission multiplexes a data stream into M streams corresponding to M transmission antennas 14, 16 . . . , M. The demultiplexed symbols are then modulated in position and transmitted on the M antennas as illustrated in FIG. 9.

Figure 9:
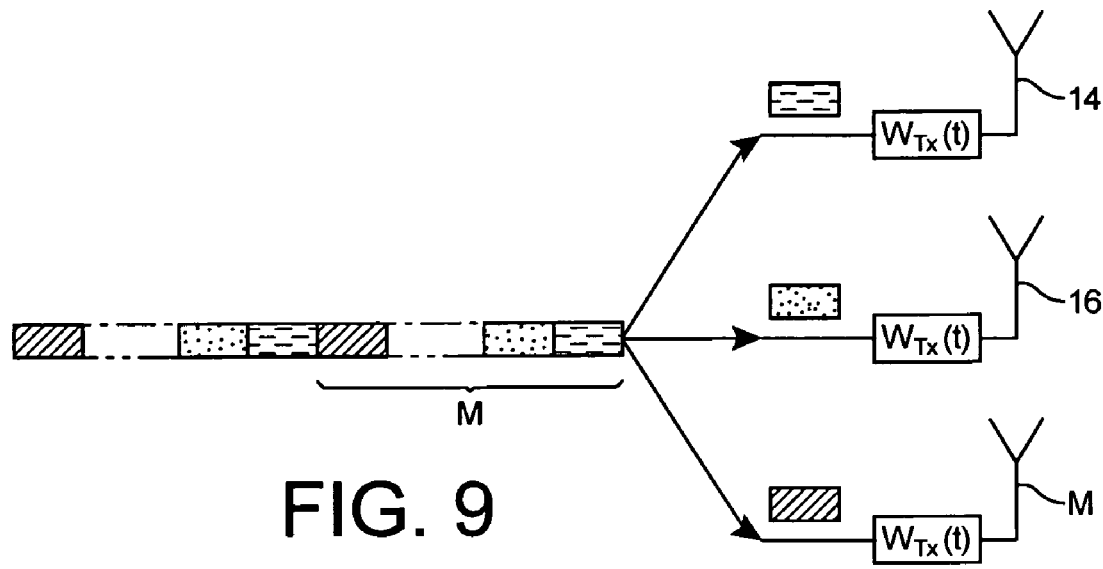
FIG. 9 shows a transmission system according to the invention during a transmission phase, FIG. 10 diagrammatically shows the first estimating step for a process according to the invention.

This FIG. 9 shows a transmission system with M antennas during a data transmission phase, $W_{Tx}(t)$ symbolises modulation, formatting of the pulse and the "front end" Tx.

The analysis is simplified by dividing the receiver into two parts.

The first part consists of building a decision vector starting from composite response estimates; the second part will use this vector and the correlation matrix to make the decision on emitted symbols.

Construction of the Decision Vector:

In this step, the receiver will compare the received signal with the discrete images of the composite responses and it will build a decision vector with length L×M starting from these comparisons.

This part is constructed based on a matched filtering block 530. This block functions very similarly to block 524 described in the estimating phase.

This block uses two numeric sequences with length $N_{ech}$ as inputs and its output is L values $d_1, d_2, \ldots d_L$; the input 530-1 corresponds to the received signal and the other input 530-2 corresponds to the reference signal (image of the composite response). The sequences at inputs 530-1 and 530-2 are denoted by $(r(1), r(2), \ldots r(N_{ech}))$ and $(h(1), h(2), \ldots h(N_{ech}))$ respectively. They are actually the sequences $(r_1^{(j)}, r_2^{(j)} \ldots r_{Nech}^{(j)})$ (the signal received by the $i^{th}$ antenna) and $(h_1^{(i,j)}, h_2^{(i,j)}, \ldots, h_{Nech}^{(i,j)})$, already defined above, respectively. The block 530 will calculate the following L quantities:

$$d_1 = r(1).h(1) + r(2).h(2) + \ldots r(N_{ech}).h(N_{ech})$$

$$d_2 = r(N_{PRI}+1).h(1) + r(N_{PRI}+2).h(2) + \ldots r(N_{ech}).h(N_{ech} - N_{PRI})$$

$$\vdots$$

$$d_L = r((L-1).N_{PRI}+1).h(1) + r((L-1).N_{PRI}+2).h(2) + \ldots r(N_{ech}).h(N_{ech} - (L-1).N_{PRI})$$

The following calculation is an example calculation of decision coefficients for a modulation 4_PPM with polarity, $N_{ech}=7$ and NPRI=1; there will be 4 correlation parameters $d_1, d_2, d_3$ and $d_4$ at the output.

$$\begin{array}{cccccccc} & r_1 & r_2 & r_3 & r_4 & r_5 & r_6 & r_7 \\ \times & h_1 & h_2 & h_3 & h_4 & h_5 & h_6 & h_7 \\ \hline & \multicolumn{7}{c}{r_1h_1 + r_2h_2 + r_3h_3 + r_4h_4 + r_5h_5 + r_6h_6 + r_7h_7 = d_1} \end{array}$$

$$\begin{array}{ccccccccc} & r_1 & r_2 & r_3 & r_4 & r_5 & r_6 & r_7 & 0 \\ \times & 0 & h_1 & h_2 & h_3 & h_4 & h_5 & h_6 & h_7 \\ \hline & \multicolumn{8}{c}{r_2h_1 + r_3h_2 + r_4h_3 + r_5h_4 + r_6h_5 + r_7h_6 = d_2} \end{array}$$

$$\begin{array}{cccccccccc} & r_1 & r_2 & r_3 & r_4 & r_5 & r_6 & r_7 & 0 & 0 \\ \times & 0 & 0 & h_1 & h_2 & h_3 & h_4 & h_5 & h_6 & h_7 \\ \hline & \multicolumn{9}{c}{r_3h_1 + r_4h_2 + r_5h_3 + r_6h_4 + r_7h_5 = d_3} \end{array}$$

$$\begin{array}{ccccccccccc} & r_1 & r_2 & r_3 & r_4 & r_5 & r_6 & r_7 & 0 & 0 & 0 \\ \times & 0 & 0 & 0 & h_1 & h_2 & h_3 & h_4 & h_5 & h_6 & h_7 \\ \hline & \multicolumn{10}{c}{r_4h_1 + r_5h_2 + r_6h_3 + r_7h_4 = d_4} \end{array}$$

Figure 15:
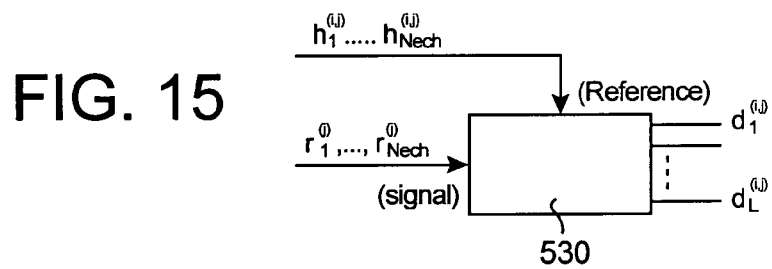

The output from each reception antenna will be divided into M parallel branches. The signal $(r_1^{(j)}, \ldots r_{Nech}^{(j)})$ received on the $i^{th}$ branch will be compared with the image of the composite response of the channel between the $i^{th}$ transmission antenna and the $j^{th}$ reception antenna $(h_1^{(i,j)}, \ldots h_{Nech}^{(i,j)})$. Decision variables at the output from block 530 will be denoted by $d_1^{(i,j)}, \ldots d_L^{(i,j)}$ (FIG. 15).

Using the initial notations, we get:

$$d_1^{(i,j)} = \Sigma_{k=1}^{k=Nech} r_k^{(j)} h_k^{(i,j)}$$

$$d_n^{(i,j)} = \Sigma_{k=1}^{k=Nech-(n)NPRI} r_{k+(n)NPRI}^{(j)} h_k^{(i,j)}$$

for n=2, . . . L, where NPRI denotes the number of samples per nominal modulation position.

FIG. 15 shows an example of processing on the $i^{th}$ branch at the output from the $j^{th}$ reception antenna for an L_PPM modulation with a polarity modulation.

The form of the decision vector with length L.M, will be as follows:

$$d = \left[ \underline{d_1^{(1)} \ldots d_L^{(1)}}, \underline{d_1^{(2)} \ldots d_L^{(2)}} \ldots \underline{d_1^{(M)} \ldots d_L^{(M)}} \right]$$

Where $d_l^i$ corresponds to the $l^{th}$ decision coefficient corresponding to the $i^{th}$ transmission antenna:

$$d_l^{(i)} = d_{l(i,1)} + d_l^{(i,2)} + \ldots d_l^{(i,N)}$$

Figure 16:
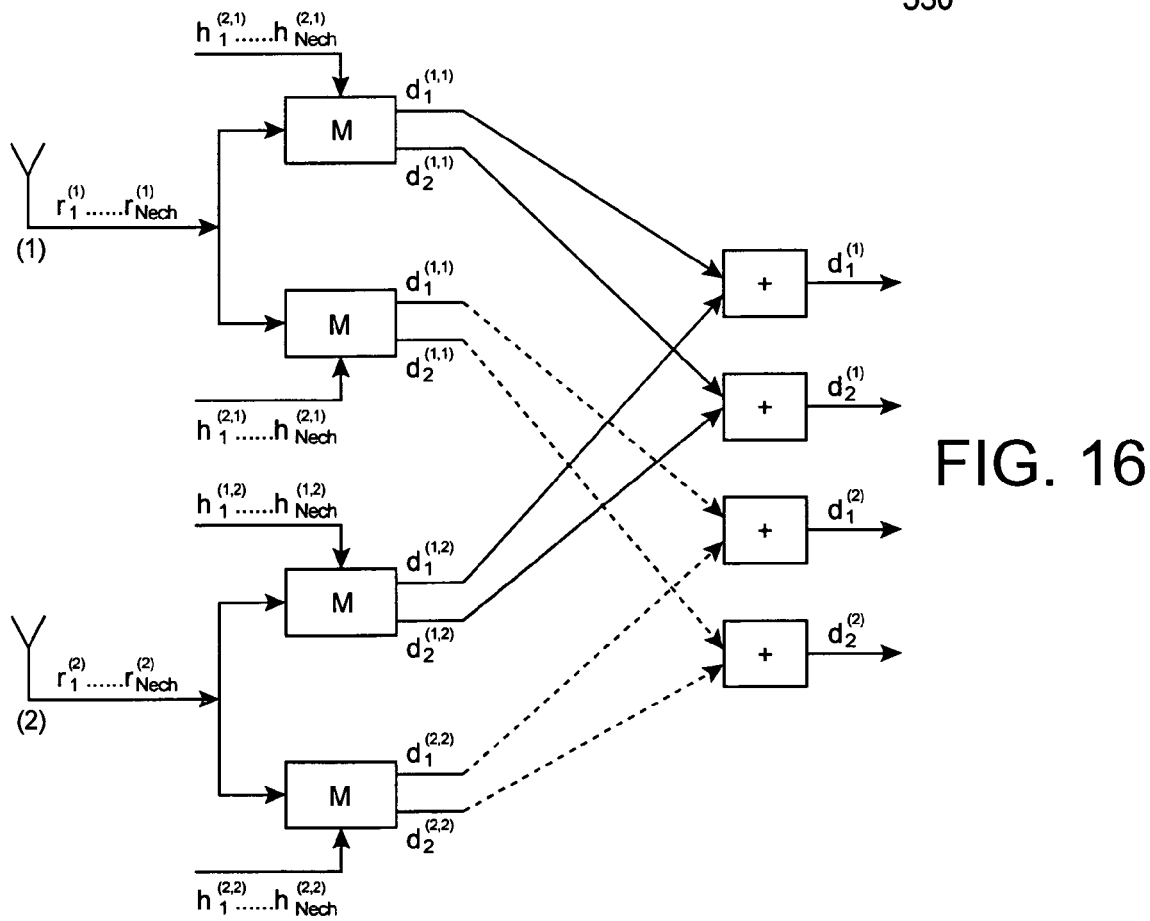

FIG. 16 shows a diagrammatic representation of the first detection step. M=2 transmission antennas, N=2 reception antennas and the modulation is 2_PPM with polarity. The four discrete images $(h_1^{(i,j)} \ldots h_{Nech}^{(i,j)})$ for i,j=1,2 are supplied by the channel estimating phase. The outputs from the matched filtering 530 are suitably added. The result is a vector with size L.M=4.

The decision step will use the decision vector and the correlation matrix (supplied by the channel estimator 520) to detect symbols emitted by the M antennas during a PRP.

This step begins with the calculation of the vector "a" such that:

$$a = R^{-1} \times d$$

Where d corresponds to the decision vector with length LM (supplied by the first detection step), R is the correlation matrix with dimensions (LM,LM) (supplied by the second channel estimating step) and $R^{-1}$ is the inverse of matrix R.

The form of the vector is as follows:

$$a = \lfloor a^{(1)}, a^{(2)}, \ldots a^{(M)} \rfloor$$

$$= \left[ \underline{a_1^{(1)} \ldots a_L^{(1)}} \underline{a_1^{(2)} \ldots a_L^{(2)}} \ldots \underline{a_1^{(M)} \ldots a_L^{(M)}} \right]$$

Where $a^{(m)}=[a_1^{(m)} \ldots a_L^{(m)}]$ is a decision vector corresponding to the symbol emitted by the $m^{th}$ transmission antenna (m=1, 2, ... M).

The nominal modulation position and the polarity of the symbol emitted by the $m^{th}$ antenna are then chosen using the following rule:

$$\begin{cases} \hat{\Delta}^{(m)} = \hat{l} = \underset{l=1,2,\ldots L}{\operatorname{argmax}} |a_l^{(m)}| \\ \hat{p}^{(m)} = \operatorname{sign}(a_{\hat{l}}^{(m)}) \end{cases}$$

In other words, the position of the maximum of the modulus a(m) corresponds to the nominal modulation position, and the sign of this maximum corresponds to the polarity of the symbol emitted by the $m^{th}$ transmission antenna.

For example, in the case of a 4_PPM modulation with polarity for 2 transmission antennas, the vector a=[1.2 0.5 −0.1 0.01, −0.8 −1.5 0.2 0.5] indicates that the first antenna emits in position 1 with a positive polarity and the second antenna emits in position 2 with a negative polarity; therefore the emitted symbols are {s1,s4}.

It is still possible to invert the matrix R because this matrix is never badly conditioned. This property is assured due to the pass band of the channel (a few GHz) that gives correlation functions close to diracs.

Figure 17:
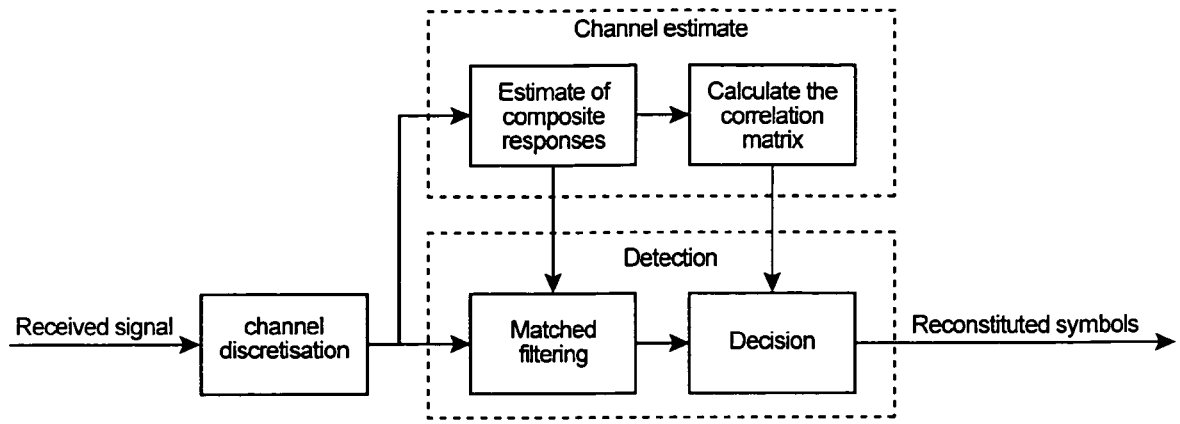
Figure 18:
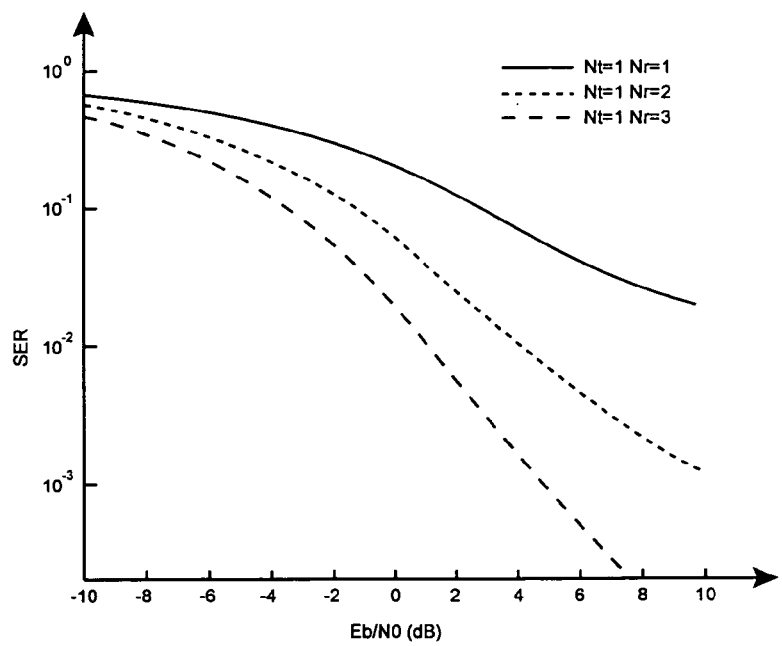
FIG. 18 shows the probability of an error by symbol as a function of the signal to noise ratio in the case of a process according to the invention.

FIG. 17 is a diagrammatic representation of the receiver. The first estimator stage is used to build reference signals for the correlation (M.N signals). The second stage consists of calculating the correlation matrix that will be used for multi antenna detection.

The first stage of the detector consists of comparing received signals with reference signals for each reception antenna, this stage is equivalent to adapted filtering in narrow band systems. The second stage of the detector makes the decision step.

The "channel estimating" block is activated during the learning phase and the "detection" block is activated during the demodulation phase of the emitted information symbols.

In some cases, a frame may be repeated several times on the emitter side for the same symbol. In this case, a coherent integration stage is added immediately after the discretisation stage.

We will assume that the complexity of the receiver may be approximated by the number of multiplications; the number of multiplications per reception block (FIG. 19) may be calculated as follows:

Estimate of Composite Responses:

$N1$ = Number of multiplications per learning symbol $= N \times M \times N_{ech}.$ Calculation of the correlation matrix:
N2=Number of multiplications per learning sequence $= N \times \dfrac{M \times (M+1)}{2} \times [(2L-1) \times N_{ech} - N_{PRI} \times L \times (L-1)].$ Matched filtering:
N3=Number of multiplications per M information symbols $= N \times M \times \left[ L \times N_{ech} - N_{PRI} \times \dfrac{L \times (L-1)}{2} \right]$ Decision:
N4=Number of multiplications per M information symbols $\approx (L \times M)^3 + (L \times M)^2$ Example Parameters:
Modulation 4_PPM with polarity (L=4).
M=N=3.
PRP=10 ns (high speed applications).
PRI=1 ns.
Signal in the [3 GHz, 5 GHz]→fech=fNyquist=10 GHz→$N_{ech}$=100 band and NPRI=10.
Learning sequence with length $N_{seq}$=100.
N1=900; N2=10440; N3=6660; N4=1872.

Note that the multiplication during the composite response estimating phase (N1) is made with a sequence of ±1 values, therefore this multiplication can be simplified to additions and subtractions.

Taking this comment into consideration, the most expensive operation in terms of the number of multiplications is the matched filtering stage. But note that these filters are made in parallel and therefore they do not introduce any detection delays.

The system proposed according to the invention is used for detection of signals modulated in position and in polarity, consequently the binary throughput is increased by a factor of $\log_2(2 \times L)$ compared to [15].

Furthermore, the complexity of the receiver is optimised by taking advantage of the properties of the inter correlation function.

$$\frac{1}{2} NM(M-1)$$

correlation blocks 524 (FIG. 12) have been removed on the architecture proposed in FIG. 13 taking advantage of the symmetry of the inter correlation function.

Composite responses of NM channels are estimated in parallel, by means of orthogonal codes introduced during the learning phase. The loss of throughput introduced by the learning phase is divided by M in comparison with a SISO system.

The use of M antennas in transmission provides a means of increasing the throughput of the system by a factor M, while the increase in the number of antennas in reception improves the performance at a fixed throughput, or equivalently, increases the throughput (by reducing the PRP) for a given performance level.

FIG. 20 illustrates the probability of error per symbol as a function of the signal to noise ratio. The modulation is 4_PPM with polarity and the system emits at a throughput of 750 Mbits/s. The SISO system (M=N=1) suffers from a high level of interference and the probability of error can never reach $10^{-2}$. Improvements introduced by 2 and 3 reception antennas appear.

The first step according to the invention is to introduce a channel estimate during a learning phase between emitting antennas and receiving antennas.

To achieve this, known pulse sequences to which a code is assigned are sent, the codes for two different antennas being orthogonal to each other.

A channel estimate uses:
for each antenna: the calculation of M estimators,
the calculation of a correlation matrix R carrying information about correlations of the different channels.

During reception of an arbitrary signal, usually PPM modulated, a decision vector is calculated starting from the received signal, using composite responses.

The decision vector and the correlation matrix are used to calculate an inverted decision vector, for which the nominal modulation position can be drawn, together with the polarity of the emitted symbol.

A device using the invention will be produced using digital converter 50, and digital processor 52 for digital processing of the received and digitised signal. The various elements 520, 530, 540 can be made using elements contained in document [4] mentioned at the end of this description, this document relating to single antenna systems.

BIBLIOGRAPHIC REFERENCES 1. www.fcc.gov.
3. Moe Z. Win and R. A. Scholtz, <<On the energy capture of ultrawide bandwidth signals in dense multipath environments>>, IEEE communication letters vol. 2, September 1998, pp. 245-247.
4. European patent EP 1 298 811 A1
5. Patent US 2003/0058963 A1
6. I. E. Tetlar, "Capacity of multi-antenna Gaussian channels", Europ. Trans. Telecommun., vol. 10, pp. 585-595, November 1999.
7. S. M. Alamouti, "A simple transmit diversity technique for wireless communications", IEEE journal on select areas in communications, vol. 16, pp. 1451-1458, October 1998.
8. V. Tarokh, H. Jafarkhani, and A. R. Calderbank, "Space-time block codes from orthogonal design", IEEE transactions on information theory, vol. 45, pp. 1456-1466, July 1999.
9. M. O. Damen, K. Abed-Meraim, and J. C. Belfiore, <<Diagonal Algebraic Space-Time Block codes>>, IEEE Transactions on Information Theory, vol. 48, pp. 628-636 March 2002.
10. Gerard J. Foschini, "Layered space-time architecture for wireless communication in a fading environment when using multi-element antennas", Technical journal, Bell Labs, 1996.
11. G. Rayleigh and J. Cioffi, <<Spatio-Temporal Coding for wireless communications>>, IEEE transactions on communications, pp. 357-366, March 1998.
12. N. Al-Dhabir, <<Frequency-Domain Equalisation for transmit diversity signaling over frequency selective fading channels>>, IEEE communications letters, July 2001.
13. Liuqing Yang and Georgios B. Giannakis, "Space-time coding for impulse radio", IEEE conference on ultra wideband systems and technologies, pp 235-239, 2002.
14. Liuqing Yang and Georgios B. Giannakis, "Analog space-time coding for multi-antenna ultra-wideband transmissions", IEEE transactions on communications, to appear 2004.
15. Martin Weisenhorn and Walter Hirt, "Performance of binary antipodal signaling over the indoor UWB MIMO channel", IEEE conference on communications, vol. 4, pp. 2872-2878, May 2003.
16. Jurgen Kunisch and Jorg Pamp, "An ultra-wideband space-variant multipath indoor radio channel model", IEEE conference on ultra wideband systems and technologies, pp. 290-294, November 2003.

The invention claimed is:

1. A learning process for an ultra wideband communication system including a transmission apparatus and a reception apparatus, the transmission apparatus including M (M≧2) emission antennas and the reception apparatus including N (N>1) reception antennas, wherein information is modulated on L possible positions, comprising:
   a) transmitting, at the transmitting apparatus, a series of $N_{seq}$ learning pulses from each emission antenna to all reception antennas at the reception apparatus, wherein the transmitting includes generating each series of pulses emitted by an emission antenna from a term by term product for a known sequence common to all emission antennas and a parity code ($c_k^{(i)}$) (k=1,2, ... $N_{seq}$) specific to each emission antenna i, the parity codes being orthogonal to each other in pair;
   b) estimating, at each reception apparatus j, M composite responses ($h_1^{(i,j)}, h_2^{(i,j)}, \ldots, h_{Nech}^{(i,j)}$) of series of emitted pulses that arrive at this reception antenna j, each response being equal to a convolution of the series of learning pulses emitted with a propagation channel transfer function from the emission antenna i to the reception antenna j, each composite response being estimated by eliminating effects of other antennas; and
   c) estimating, at the reception apparatus, correlations (R) between different channels.

2. The process according to claim 1, wherein step b) further comprises, for each channel defined by an emission antenna i (i=1, ..., M) and arriving at the reception antenna j:
   sampling in $N_{ech}$ samples of each of the $N_{seq}$ received pulse frames, where $r_k^{(i)}$ denotes the $K^{th}$ sample of the signal received by the $j^{th}$ antenna, and
   calculating an average according to $$h_n^{(i,j)} = (\Sigma_{k=1}^{k=Nseq} c_k^{(i)} x r_{n+(k-1)Nech}^{(j)})/N_{seq}.$$

3. The process according to claim 1, wherein step c) further includes estimating a correlation matrix (R(j)) for each reception antenna, and adding the N matrices to form a total correlation matrix (R).

4. The process according to claim 3, further comprising:
   for each reception antenna j, calculating a correlation matrix for each pair of channels (i,j), (i',j), where i and i' denote arbitrary emission antennas,
   for each reception antenna j, calculating the correlation matrix R(j), and
   calculating a total correlation matrix (R) by summating individual correlation matrices R(j) for each reception antenna j.

5. The process according to claim 4, wherein a size of the matrix R(j) is (L×M, L×M), and the matrix R(j) is composed of matrices $R^{(\alpha,j)(\beta,j)}$ $$R^{(j)} = \begin{bmatrix} R^{(1,j)(1,j)} & R^{(2,j)(1,j)} & \ldots & \ldots & R^{(M,j)(1,j)} \\ [R^{(2,j)(1,j)}]^T & R^{(2,j)(2,j)} & R^{(3,j)(2,j)} & \ldots & \ldots \\ \ldots & [R^{(3,j)(2,j)}]^T & R^{(3,j)(3,j)} & \ldots & \ldots \\ \ldots & \ldots & \ldots & \ldots & \ldots \\ [R^{(M,j)(1,j)}]^T & \ldots & \ldots & \ldots & R^{(M,j)(M,j)} \end{bmatrix}$$

wherein each matrix $R^{(i,j)(i',j)}$ has terms $r(i, i',j)_{l,c}$ (l=1, ... L, c=1, ... L) defined by:
for l=c: $r(i, i',j)_{l,c} = R_0$
for l>c: $r(j)_{l,c} = R_{l-c}$
for l<c: $r(j)_{l,c} = R_{-(l-c)}$
where:

$$R_0 = \sum_{k=1}^{k=Nech} h_k^{(i,j)} h_k^{(i',j)}$$

$$R_{l-c} = \sum_{k=1}^{k=Nech-(l-c)NPRI} h_{k+(l-c)NPRI}^{(i,j)} h_k^{(i',j)}$$

$$R_{-(l-c)} = \sum_{k=1}^{k=Nech-(l-c)NPRI} h_k^{(i,j)} h_{k+(l-c)NPRI}^{(i',j)}$$

and where NPRI denotes a number of samples per nominal modulation position.

6. The process according to claim 1, wherein step c) is done from M composite responses.

7. A communication process, for communication of ultra wide band PPM modulated signals, using M transmission antennas and N reception antennas comprising:
the learning process according to claim 1,
entering a transmission phase for a stream of data symbols, then for each transmitted signal and for each reception antenna j, comparing the composite responses $(h_1^{(i,j)}, h_2^{(i,j)}, \ldots, h_{Nech}^{(i,j)})$ to the series $(r_1^{(j)}, \ldots r_{Nech}^{(j)})$ of pulses received by this reception antenna j, each received pulse being equal to the convolution of a pulse emitted with the propagation channel transfer function from the emission antenna i to the reception antenna j,
for each channel (i,j), calculating L decision variables $d_1^{(i,j)}, d_2^{(i,j)}, \ldots, d_L^{(i,j)}$, in which:

$$d_1^{(i,j)} = \sum_{k=1}^{k=Nech} r_k^{(j)} h_k^{(i,j)}$$

$$d_n^{(i,j)} = \sum_{k=1}^{k=Nech-(n)NPRI} r_{k+(n)NPRI}^{(j)} h_k^{(i,j)}$$

for n=2, ... L,
where NPRI denotes the number of samples per nominal modulation position,
then calculating a decision coefficient $d_l^{(i)} = d_l^{(i,1)} + d_l^{(i,2)} + \ldots d_l^{(i,N)}$, and a decision vector $$d = [d_1^{(1)} \ldots d_L^{(1)}, d_1^{(2)} \ldots d_L^{(2)} \ldots d_1^{(M)} \ldots d_L^{(M)}]$$

wherein $d_l^i$ corresponds to the $l^{th}$ decision coefficient corresponding to the $i^{th}$ transmission antenna.

8. The process according to claim 7, the learning process comprises:
transmitting a sequence through M channels to M transmission antennas, and
term by term multiplying the sequence of each channel with a sequence of parity codes, the codes being orthogonal to each other in pairs.

9. The process according to claim 7, wherein a separation between emission antennas enables decorrelation between channels.

10. The process according to claim 7, wherein the entering the transmission phase for the stream of data symbols comprises:
demultiplexing the stream of symbols into M streams of symbols corresponding to the M transmission antennas, position modulating the M streams of symbols, and
transmitting position modulated M streams of symbols to M transmission antennas.

11. The process according to claim 1, wherein a separation between emission antennas enables decorrelation between channels.

12. The process according to claim 11, wherein a separation d between two emission antennas satisfies $d/\lambda > 0.5$, where $\lambda$ is a wavelength corresponding to a central frequency.

13. A signal detection process, for detection of signals transmitted by transmission antennas in an ultra wideband communication system including a transmission apparatus and a reception apparatus, the transmission apparatus including M (M≧2) transmission antennas and the reception apparatus including N (N>2) reception antennas, wherein information is modulated on L possible positions, comprising:
for each reception antenna,
a) comparing, at the reception apparatus, composite responses $(h_1^{(i,j)}, h_2^{(i,j)}, \ldots, h_{Nech}^{(i,j)})$ obtained for a known signal for each channel defined by an emission antenna i and a reception antenna j, with a series of pulses $(r_1^{(j)}, \ldots r_{Nech}^{(j)})$ received by each reception antenna j, each received pulse being equal to a convolution of a pulse emitted with a propagation channel transfer function from the emission antenna i to the reception antenna j,
b) constructing, at the reception apparatus, a decision vector d with length L·M, wherein the constructing includes calculating L decision variables $d_1^{(i,j)}, d_2^{(i,j)}, \ldots, d_L^{(i,j)}$ for each channel (i,j), where:

$$d_1^{(i,j)} = \sum_{k=1}^{k=Nech} r_k^{(j)} h_k^{(i,j)}$$

$$d_n^{(i,j)} = \sum_{k=1}^{k=Nech-(n)NPRI} r_{k+(n)NPRI}^{(j)} h_k^{(i,j)}$$

for n=2, ... L,
where NPRI denotes a number of samples per nominal modulation position,
calculating a decision coefficient $d_l^{(i)} = d_l^{(i,1)} + d_l^{(i,2)} + \ldots d_l^{(i,N)}$, and
calculating a decision vector $$d = [d_1^{(1)} \ldots d_L^{(1)}, d_1^{(2)} \ldots d_L^{(2)} \ldots d_1^{(M)} \ldots d_L^{(M)}]$$

wherein $d_l^i$ corresponds to an $l^{th}$ decision coefficient corresponding to the $i^{th}$ transmission antenna, and
c) estimating, at the reception apparatus, symbols emitted by transmission antennas from the decision vector and correlations (R) between the different channels.

14. The process according to claim 13, further comprising:
calculating a vector a:

$$a = R^{-1} \times d,$$

where R is the correlation matrix with dimensions (LM, LM) of the communication system.

15. The process according to claim 14, further comprising determining a nominal modulation position and a polarity of the symbol emitted by each transmission antenna.

16. The process according to claim 15, further comprising determining the nominal modulation position and the polarity of the symbol emitted by the $m^{th}$ antenna by a position of a maximum of a modulus of a(m), and by a sign of this maximum respectively, where a(m) is the decision vector corresponding to the symbol emitted by the $m^{th}$ antenna.

17. The process according to claim 14, in which the vector a is in a following form:

$$a = \lfloor a^{(1)}, a^{(2)}, \ldots a^{(M)} \rfloor$$
$$= [\underline{a_1^{(1)} \ldots a_L^{(1)}} \underline{a_1^{(2)} \ldots a_L^{(2)}} \ldots \underline{a_1^{(M)} \ldots a_L^{(M)}}]$$

where $a^{(m)} = \lfloor a_1^{(m)} \ldots a_L^{(m)} \rfloor$ is a decision vector corresponding to the symbol emitted by the $m^{th}$ transmission antenna (m=1,2, ... M).

18. The process according to claim 13, wherein a separation between emission antennas enables decorrelation between channels.

19. An ultra wide band communication system comprising:
M emission antennas (M≧2);
N reception antennas (M≧1), and:
for each reception antenna j, an estimator of composite responses $(h_1^{(i,j)}, h_2^{(i,j)}, \ldots, h_{Nech}^{(i,j)})$ of a series of emitted pulses that reach this reception antenna j, each response being equal to the convolution of the series of pulses emitted with the propagation channel transfer function from the emission antenna i to the reception antenna j, each composite response being estimated by eliminating the effects of other antennas;
an estimator configured to estimate correlations (R) between different channels; and
an estimator configured to estimate a symbol emitted by an emission antenna as a function of a received signal $(r_1^{(j)}, \ldots r_{Nech}^{(j)})$ based the composite responses and the correlations, wherein the estimator of the symbol also includes a calculator of L decision variables $d_1^{(i,j)}$, $d_2^{(i,j)}, \ldots, d_L^{(i,j)}$ for each channel i (i=1, ..., M) reaching the reception antenna j, where:

$$d_1^{(i,j)} = \sum_{k=1}^{k=Nech} r_k^{(j)} h_k^{(i,j)}$$

$$d_n^{(i,j)} = \sum_{k=1}^{k=Nech-(n)NPRI} r_{k+(n)NRPI}^{(j)} h_k^{(i,j)}$$

for n=2, ... L,
where NPRI denotes the number of samples per nominal modulation position, and
a calculator of a decision coefficient $d_l^{(i)} = d_l^{(i,1)} + d_l^{(i,2)} + \ldots d_l^{(i,N)}$, and a decision vector $$d = [\underline{d_1^{(1)} \ldots d_L^{(1)}}, \underline{d_1^{(2)} \ldots d_L^{(2)}} \ldots \underline{d_1^{(M)} \ldots d_L^{(M)}}]$$

wherein $d_l^i$ corresponds to the $l^{th}$ decision coefficient corresponding to the $i^{th}$ transmission antenna.

20. A communication system according to claim 19, further comprising a calculator of a vector a:

$$a = R^{-1} \times d,$$

where R is the correlation matrix with dimensions (LM, LM) of the communication system.

21. The communication system according to claim 20, further comprising a finder of a nominal modulation position and a polarity of the symbol emitted by each emission antenna.

* * * * *